(12) United States Patent
Lisoski et al.

(10) Patent No.: US 12,130,639 B2
(45) Date of Patent: Oct. 29, 2024

(54) METHOD OF MANAGING A FLEET OF HIGH ALTITUDE LONG ENDURANCE AIRCRAFT

(71) Applicant: AEROVIRONMENT, INC., Arlington, VA (US)

(72) Inventors: Derek Lisoski, Simi Valley, CA (US); Bart Dean Hibbs, Simi Valley, CA (US)

(73) Assignee: Aero Vironment, Inc., Arlington, VA (US)

( * ) Notice: Subject to any disclaimer, the term of this patent is extended or adjusted under 35 U.S.C. 154(b) by 361 days.

(21) Appl. No.: 17/605,942

(22) PCT Filed: Apr. 23, 2020

(86) PCT No.: PCT/US2020/029663
§ 371 (c)(1),
(2) Date: Oct. 22, 2021

(87) PCT Pub. No.: WO2020/226908
PCT Pub. Date: Nov. 12, 2020

(65) Prior Publication Data
US 2022/0197311 A1    Jun. 23, 2022

Related U.S. Application Data

(60) Provisional application No. 62/838,783, filed on Apr. 25, 2019, provisional application No. 62/838,833, (Continued)

(51) Int. Cl.
*G05D 1/00* (2024.01)
*B64C 39/02* (2023.01)

(52) U.S. Cl.
CPC .......... *G05D 1/104* (2013.01); *B64C 39/024* (2013.01); *G05D 1/042* (2013.01); *G05D 1/0653* (2013.01); *B64U 2201/102* (2023.01)

(58) Field of Classification Search
None
See application file for complete search history.

(56) References Cited

U.S. PATENT DOCUMENTS 2,478,758 A    8/1949    Frieder et al.
2,898,058 A    8/1959    Del
(Continued)

FOREIGN PATENT DOCUMENTS

AU    2007200943 A1    9/2007
DE    102017102481 A1    8/2018
(Continued)

OTHER PUBLICATIONS

International Search Report for PCT/US20/29663 mailed on Oct. 16, 2020.
(Continued)

*Primary Examiner* — Jonathan M Dager
*Assistant Examiner* — Charles Pall
(74) *Attorney, Agent, or Firm* — Concept IP LLP; Pejman Yedidsion; Eric Aagaard (57) ABSTRACT

Systems, devices, and methods for a fleet of three or more unmanned aerial vehicles (UAVs), where each UAV of the fleet of UAVs comprise a respective flight control computer (FCC); at least one computing device at a ground control station, where each computing device is in communication with each FCC, and where each computing device is associated with at least one operator; where the fleet of UAVs above the threshold altitude are in communication with the first computing device monitored by at least one operator such that a ratio of operators to UAVs above the threshold altitude exceeds a 1:1 ratio; and where the first UAV below the threshold altitude is in communication with the second computing device monitored by at least one operator such
(Continued)

that a ratio of operators to UAVs below the threshold altitude does not exceed the 1:1 ratio.

17 Claims, 9 Drawing Sheets

Related U.S. Application Data filed on Apr. 25, 2019, provisional application No. 62/855,581, filed on May 31, 2019.

(56) References Cited

U.S. PATENT DOCUMENTS

| | | | |
|---|---|---|---|
| 4,916,612 A | 4/1990 | Chin et al. | |
| 5,175,712 A | 12/1992 | Vaccaro et al. | |
| 5,349,654 A | 9/1994 | Bond et al. | |
| 5,552,985 A | 9/1996 | Hori | |
| 5,810,284 A | 9/1998 | Hibbs et al. | |
| 5,903,717 A | 5/1999 | Wardrop | |
| 6,056,237 A | 5/2000 | Woodland | |
| 6,550,018 B1 | 4/2003 | Abonamah et al. | |
| 6,684,275 B1 | 1/2004 | Goldstein | |
| 8,191,831 B2 | 6/2012 | Nadir | |
| 8,577,519 B1 | 11/2013 | Varnavas et al. | |
| 8,948,960 B2 | 2/2015 | Griffith | |
| 9,654,200 B2* | 5/2017 | Mazzarella | H04L 65/401 |
| 9,694,894 B2 | 7/2017 | Deakin | |
| 9,959,773 B2 | 5/2018 | Raptopoulos et al. | |
| 10,005,541 B2 | 6/2018 | Karem et al. | |
| 10,095,242 B1 | 10/2018 | Novak | |
| 10,155,588 B2 | 12/2018 | Fisher et al. | |
| 10,476,296 B1 | 11/2019 | Rausch et al. | |
| 2004/0075018 A1 | 4/2004 | Yamane | |
| 2006/0278757 A1 | 12/2006 | Kelleher | |
| 2007/0168711 A1 | 7/2007 | Chen | |
| 2008/0033604 A1* | 2/2008 | Margolin | G05D 1/0044 701/2 |
| 2010/0292873 A1 | 11/2010 | Duggan et al. | |
| 2011/0282502 A1 | 11/2011 | Fife et al. | |
| 2012/0110374 A1 | 5/2012 | Brewerton et al. | |
| 2013/0062457 A1 | 3/2013 | Deakin | |
| 2013/0135030 A1 | 5/2013 | Barrenscheen et al. | |
| 2014/0021288 A1 | 1/2014 | Elson et al. | |
| 2014/0032034 A1 | 1/2014 | Raptopoulos et al. | |
| 2014/0188776 A1 | 7/2014 | Shuster et al. | |
| 2014/0249693 A1* | 9/2014 | Stark | G08G 5/0039 701/2 |
| 2014/0316616 A1 | 10/2014 | Kugelmass | |
| 2015/0066248 A1 | 3/2015 | Arbeit et al. | |
| 2015/0097071 A1 | 4/2015 | Frolov et al. | |
| 2015/0102172 A1 | 4/2015 | Thurn | |
| 2015/0115106 A1 | 4/2015 | Coffey et al. | |
| 2015/0097079 A1 | 6/2015 | Frolov et al. | |
| 2015/0203200 A1 | 7/2015 | Bye et al. | |
| 2015/0314741 A1 | 11/2015 | Ueta et al. | |
| 2015/0327136 A1* | 11/2015 | Kim | H04W 36/08 370/331 |
| 2016/0009390 A1 | 1/2016 | Kugelmass et al. | |
| 2016/0009402 A1 | 1/2016 | Hunter | |
| 2016/0039541 A1 | 2/2016 | Beardsley et al. | |
| 2016/0075452 A1 | 3/2016 | Robles et al. | |
| 2016/0307448 A1 | 10/2016 | Salnikov et al. | |
| 2016/0347467 A1 | 12/2016 | Salesse-Lavergne et al. | |
| 2016/0368590 A1 | 12/2016 | Karem et al. | |
| 2017/0069145 A1 | 3/2017 | Dorkel et al. | |
| 2017/0195048 A1* | 7/2017 | Sham | H04N 7/22 |
| 2017/0248125 A1 | 8/2017 | Luchsinger et al. | |
| 2017/0334559 A1 | 11/2017 | Bouffard et al. | |
| 2018/0009764 A1 | 1/2018 | Mitchell et al. | |
| 2018/0048160 A1 | 2/2018 | Narla et al. | |
| 2018/0086459 A1 | 3/2018 | Rios | |
| 2018/0090016 A1 | 3/2018 | Nishi et al. | |
| 2018/0273170 A1 | 9/2018 | D'Sa et al. | |
| 2018/0362158 A1* | 12/2018 | Zhang | B64C 39/024 |
| 2019/0107408 A1 | 4/2019 | Stroman et al. | |
| 2019/0161190 A1 | 5/2019 | Gil et al. | |
| 2019/0300185 A1 | 10/2019 | Tang et al. | |
| 2019/0377021 A1 | 12/2019 | Bhalwankar et al. | |
| 2019/0389602 A1 | 12/2019 | Schilling | |
| 2020/0101571 A1 | 4/2020 | Datas et al. | |
| 2021/0061027 A1 | 3/2021 | Da et al. | |
| 2021/0072772 A1 | 3/2021 | Miyakawa et al. | |
| 2021/0091848 A1 | 3/2021 | Cai | |
| 2021/0319705 A1 | 10/2021 | Furumoto | |
| 2021/0064063 A1 | 11/2021 | Wakikawa | |
| 2021/0080285 A1 | 11/2021 | Connor | |
| 2021/0258067 A1 | 11/2021 | Hoshino et al. | |
| 2022/0348356 A1 | 11/2022 | Millspaugh | |

FOREIGN PATENT DOCUMENTS

| | | |
|---|---|---|
| EP | 2949516 A1 | 12/2015 |
| JP | s63644 A | 1/1988 |
| JP | 2001102801 A | 4/2001 |
| JP | 2003223338 A | 8/2003 |
| JP | 2004130852 A | 4/2004 |
| JP | 2008207705 A | 9/2008 |
| JP | 2019054490 A | 4/2020 |
| WO | 2017083406 A1 | 5/2017 |
| WO | 2017130137 A1 | 8/2017 |
| WO | 2017197245 A1 | 11/2017 |
| WO | 2018234799 A1 | 12/2018 |

OTHER PUBLICATIONS

Fayyaz Muhammad et al.:" Survey and future directions of fault-tolerant distributed computing on board spacecraft", Advances in Space Research, Elsevier, Amsterdam, NL, vol. 58, No. 11, Aug. 22, 2016 (Aug. 22, 2016), pp. 2352-2375, XP029801074, ISSN: 0273-1177, DOI: 10.1016/J.ASR.2016.08.017*p. 2354, section 2.2 p. 2355, Fig. 1 and left col. 2nd paragraphp. 2360-2361:section 4.2.1 .*

Abraham et al, "Dynamic Optimization of High-Altitude Solar Aircraft Trajectories Under Station-Keeping Constraints", Journal of Guidance and Control and Dynamics, vol. 42, No. 3, Nov. 26, 2018, pp. 538-552.

Hosseini Saghar et al.: "Optimal path planning and power allocation for a long endurance solar-powered UAV", 2015 American Control Conference (ACC), IEEE, Jun. 17, 2013 (Jun. 17, 2013), pp. 2588-2593, XP032476633, ISSN: 0743-1619, DOI: 10.1109/ACC. 2013.6580224 [retrieved on Aug. 14, 2013] *p. 2589-p. 2592*.

Lee Joo-Seok et al.: Flight path optimization of solar powered UAV for endurance flight, 2015 54th Annual Conference of the Society of Instrument and Control Engineers of Japan( (SICE), The Society of Instrument and Control Engineers—SICE, Jul. 28, 2015 (Jul. 28, 2015), pp. 820-823, XP033220597, DOI:10.1109/SICE.2015. 7285496 [retrieved on Sep. 30, 2015] *whole document*.

Sumada Tomolawn, Miyagi **, special : jet-engine digital control system for a microcomputer aircraft for carrying moving objects, research report of informationprocessing society, Japan, Incorporated Information Processing Society, Dec. 12, 1991, vol. 91, No. 109, pp. 1-8.

* cited by examiner

METHOD OF MANAGING A FLEET OF HIGH ALTITUDE LONG ENDURANCE AIRCRAFT

CROSS-REFERENCE TO RELATED APPLICATION

This application is a 35 U.S.C § 371 National Stage Entry of International Application No. PCT/US2020/029663, filed Apr. 23, 2020, which claims priority to and the benefit of U.S. Provisional Patent Application No. 62/838,783, filed Apr. 25, 2019, U.S. Provisional Patent Application No. 62/838,833, filed Apr. 25, 2019, and U.S. Provisional Patent Application No. 62/855,581, filed May 31, 2019, the contents of all of which are hereby incorporated by reference herein for all purposes.

FIELD OF ENDEAVOR

The invention relates to generally to unmanned aerial vehicles (UAVs), and more particularly to managing multiple UAVs.

BACKGROUND

Unmanned aerial vehicles (UAVs), such as a High Altitude Long Endurance aircraft, are lightweight planes that are capable of controlled, sustained flight. UAVs may be associated with ground-based operators for two-way communications.

SUMMARY

A system embodiment may include: a fleet of three or more unmanned aerial vehicles (UAVs), where each UAV of the fleet of UAVs comprise a respective flight control computer (FCC); at least one computing device at a ground control station, where each computing device may be in communication with each FCC of the fleet of three or more UAVs, and where each computing device may be associated with at least one operator (106A-C) of a set of operators; where upon the descent of the first UAV below a threshold altitude, the first computing device triggers a second computing device to operate the descent of the first UAV; where the fleet of UAVs above the threshold altitude are in communication with the first computing device monitored by at least one operator such that a ratio of operators to UAVs above the threshold altitude exceeds 1:1; and where the first UAV below the threshold altitude may be in communication with the second computing device monitored by at least one operator such that a ratio of operators to UAVs below the threshold altitude does not exceed 1:1.

In additional system embodiments, a first computing device transmits a descend signal to a first UAV of the fleet of three or more UAVs (101A-E) to cause the first UAV to descend. In additional system embodiments, the first computing device transmits an ascend signal to a second UAV of the fleet of three or more UAVs (101A-E) to cause the second UAV to descend.

In additional system embodiments, upon the launch of the second UAV from a landing area, the first computing device triggers a third computing device to operate the launch and ascent of the second UAV. In additional system embodiments, upon the ascent of the second UAV above the threshold altitude, the third computing device triggers the first computing device to operate the second UAV as part of the fleet of three or more UAVs.

In additional system embodiments, the threshold altitude may be 65,000 feet. In additional system embodiments, each UAV in the fleet of three or more UAVs may be a High Altitude Long Endurance Aircraft.

A method embodiment may include: sending, by a first computing device of at least one computing device at a ground control station, a descend command signal for a first unmanned aerial vehicle (UAV) of a fleet of three or more UAVs; triggering, by the first computing device, a second computing device to operate the descent of the first UAV upon the descent of the first UAV below a threshold altitude; where the fleet of UAVs above the threshold altitude are in communication with the first computing device monitored by at least one operator such that a ratio of operators to UAVs above the threshold altitude exceeds 1:1; and where the first UAV below the threshold altitude may be in communication with the second computing device monitored by at least one operator such that a ratio of operators to UAVs below the threshold altitude does not exceed 1:1.

In additional method embodiments, each UAV of the fleet of UAVs comprise a respective flight control computer (FCC), where each computing device may be in communication with each FCC of the fleet of three or more UAVs, and where each computing device may be associated with at least one operator of a set of operators.

Additional method embodiments may include: receiving, by the respective FCC of the first UAV, the sent descend command signal; and descending, by the first UAV controlled by the respective FCC, in response to the sent descend command signal. Additional method embodiments may include: sending, by the first computing device, an ascend command signal for a second unmanned aerial vehicle (UAV) located on a landing area. Additional method embodiments may include: triggering, by the first computing device, a third computing device to operate the launch and ascent of the second UAV up to the threshold altitude. Additional method embodiments may include: triggering, by the third computing device, the first computing device to operate the second UAV upon the ascent of the second UAV above the threshold altitude as part of the fleet of three or more UAVs.

In additional method embodiments, the threshold altitude may be 65,000 feet. In additional method embodiments, each UAV in the fleet of three or more UAVs may be a High Altitude Long Endurance Aircraft.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

The following description is made for the purpose of illustrating the general principles of the embodiments discloses herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

A system and method for managing a fleet of unmanned aerial vehicles (UAVs) is disclosed herein. In one embodiment, the UAVs are High Altitude Long Endurance aircraft. Each UAV has a wingspan of approximately 260 feet and may be propelled by ten electric motors powered by solar panels covering the surface of the wing, resulting in zero emissions. Flying at an altitude of approximately 65,000 feet above sea level and above the clouds, each UAV is designed for continuous, extended missions of up to months without landing.

The UAVs need to be managed in an optimal way to mitigate strong wind and turbulence exposure. Furthermore, the UAVs may need to be brought down to land by an operator, or operators, at the ground control station, or ground control stations, for servicing and maintenance, and then re-launched to join the airborne fleet. It may be desired for UAVs to take-off and land in good weather, which may affect a schedule for managing the fleet.

Additionally, there may be regulations in place, such as FAA certifications, that present a challenge for managing a large number of UAVs. More specifically, under certain conditions the FAA certification may require a "1-to-1" ratio, where at least one operator is associated with each one UAV. In some embodiments, the number of required operators may be a function of the altitude of the UAVs. This presents a challenge logistically and financially for a large fleet of UAVs.

In one embodiment, to cover all of the land areas, a UAV fleet has an "N:M" ratio of operators to UAVs to provide effective fleet management, such that there is a sufficient number of operators to operate the UAV fleet. More specifically, N number of operators monitor M number of UAVs. In one example, a constellation of UAVs may have an N:M ratio of 1:50. For example, there may be 10 operators for 500 UAVs.

UAVs often need to be scheduled for descent and recovery. For each UAV that descends from the airborne fleet, at least one other UAV that is already on the ground may launch to take its place with the airborne fleet. In one embodiment, operators of the UAVs that are on station may transfer operation to another set of operators that would provide for a 1:1 ratio specifically for descent and landing operations. The transition from N:M (where N<M) to 1:1 may happen as a UAV descends below approximately 60,000 ft, resulting in a requirement of 1:1 operator-to-UAV ratio below that 60,000 ft threshold until the aircraft lands. In another example, the transition may occur at a few thousand feet above the landing area. Delaying of the transition from N:M to 1:1 to lower altitude would require less operator workload and fewer operators. Furthermore, the speed of ascent and descent of a UAV is critical, since the faster the UAV can ascend and descend, the less 1:1 operator-to-UAV time is required. In one embodiment, the UAVs may, for example, ascend at a rate of 150 ft/min. The descent rate is limited by how much drag the UAV motors or other devices may produce. Drag from the motors may be increased by stopping the propellers or running them in reverse. Alternatively, if there is enough capacity in the UAV battery, the battery may be further charged in the descent by running the motors at a reduced speed such that the propellers of the motors operate as wind turbines to produce power and drag is produced to increase the descent rate.

Additionally, the UAVs may be substantially autonomous, thereby further reducing the operator workload. One embodiment may include a method for semi-autonomous management of the UAV fleet, wherein the UAVs may communicate with one another for ideal separation, positioning of the fleet for flying in optimal wind conditions, station-keeping the fleet, and the like.

Figure 1:
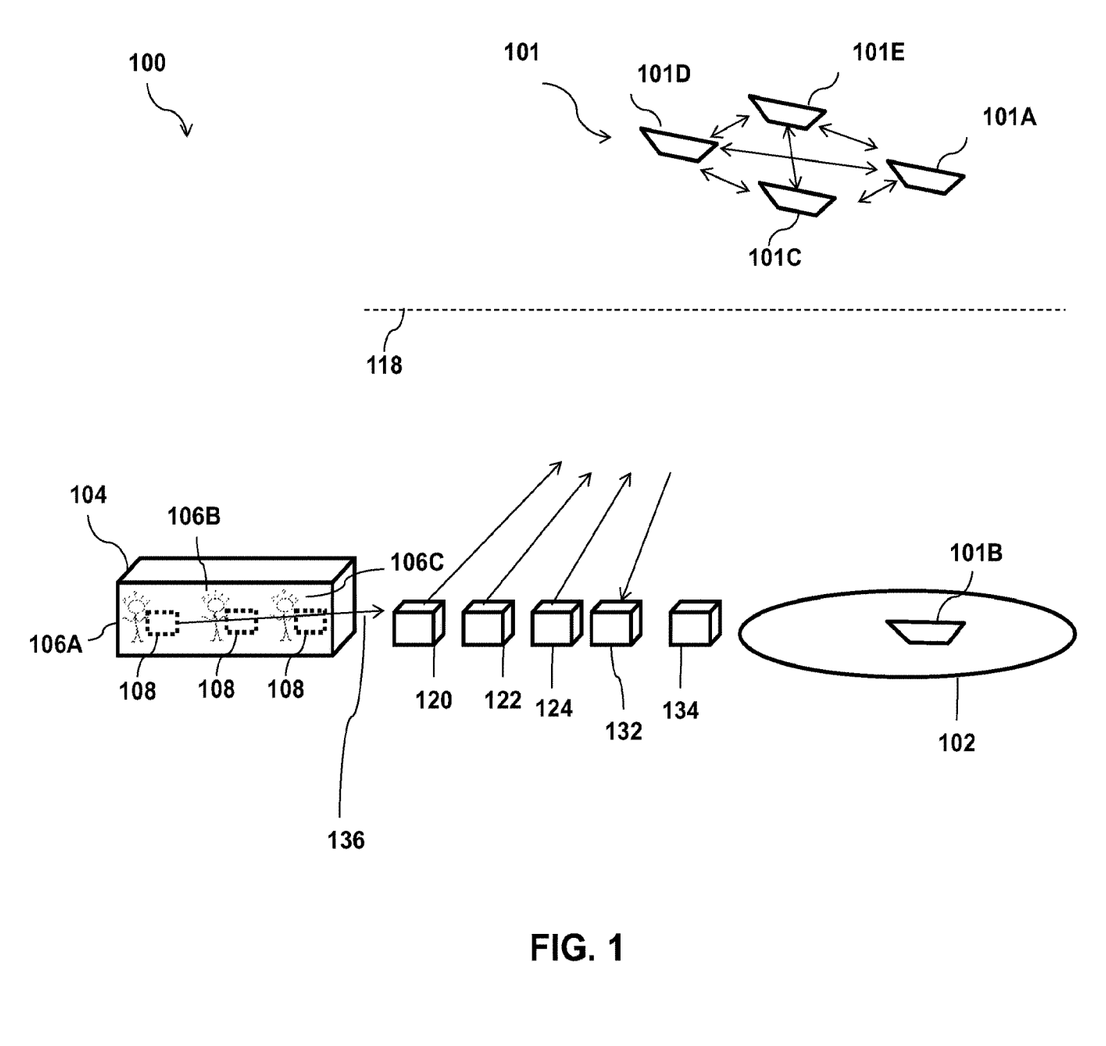
FIG. 1 depicts a system for managing a fleet of unmanned aerial vehicles, according to one embodiment.

With reference to FIG. 1, unmanned aerial vehicles 101A-E are aircraft with no onboard pilot and may fly autonomously or remotely. In one embodiment, the UAVs 101A-E are High Altitude Long Endurance aircraft. The UAVs 101A-E may have between one and forty motors, and wingspans between 100 feet and 400 feet. In one embodiment, the UAVs 101A-E may have a wingspan of approximately 260 feet and are propelled by 10 electric motors powered by a solar array covering a portion of a surface of the wing of the UAV, resulting in zero emissions. Flying at an altitude of approximately 65,000 feet above sea level and above the clouds, the UAVs 101A-E are designed for continuous, extended missions of up to months without landing. In another embodiment, the UAVs 101A-E may fly at 60,000 feet above sea level.

The UAVs 101A-E function optimally at high altitude due at least in part to the lightweight payload of the UAVs 101A-E. The UAVs 101A-E are capable of considerable periods of sustained flight without recourse to land. In one embodiment, the aircraft 101A-E may each weigh approximately 3,000 lbs and may include wing panel sections and a center panel, providing for efficient assembly and disassembly of the UAVs 101A-E due to the attachability and detachability of the wing panel sections to each other and/or to the center panel.

Technically, a fleet is comprised of at least three aircraft. However, a fleet will typically have substantially more than three aircraft. For clarity and simplicity of the FIG. 1 schematic, the five aircraft 101A-E are incorporated. A similar schematic could incorporate three, five, or more than five aircraft to the same end.

A fleet of UAVs may consist of hundreds, or even thousands, of UAVs. The UAVs 101A-E often need to be scheduled for descent and recovery. In one embodiment, at least one UAV 101A descends from the airborne fleet and lands at a landing area 102 for general repairs, maintenance, and the like. Still further, the UAV 101A may be re-launched at a later time, and in the meantime at least one other UAV 101B is launched from the landing area 102 to join the fleet and replace the grounded UAV 101A.

In one embodiment, the landing area 102 is of a circular shape allowing for approach and take-off from the landing area 102 in any direction. Other landing area shapes are possible and contemplated. The landing area may be paved with asphalt or concrete. In other embodiments, the landing area may be made of grass or another organic material.

Proximate the landing area 102 is at least one ground control station 104. The ground control station 104 may be a central hub for UAV fleet management. With respect to FIG. 1, a group of four UAVs 101A,C,D,E are in a set of geostationary flight patterns within the stratospheric layer of the atmosphere and may be within a beam width of a terrestrial GPS receiver 134 associated with the ground station 104. The GPS receiver 134 may be configured to provide the position of the ground control station 104 to the operators and to the UAV fleet 101A-E. Each UAV 101A-E may include a dedicated GPS receiver for calculating positions of the respective UAVs 101A-E and may communicate associated position data to the ground control station 104 over a terrestrial RF receiver 132 in communication with the ground control station 104. In one embodiment, a terrestrial RF emitter 124 may emit signals to the UAV fleet 101A-E to communicate with the UAV fleet 101A-E. Other emitters configured for terrestrial communication with the UAV fleet 101A-E may be included, such as a visual band emitter 122 and an infrared (IR) emitter 120. The GPS receiver 134, IR emitter 120, visual band emitter 122, RF emitter 124, and/or terrestrial RF receiver 132 may be in communication with the ground control station 104. In some embodiments, the ground control station 104 may include the GPS receiver 134, IR emitter 120, visual band emitter 122, RF emitter 124, and/or terrestrial RF receiver 132.

In one embodiment, a group of three operators 106A-C are located at the ground control station 104 for management of the fleet of UAVs 101A-C. At least one operator, such as a first operator 106A, is required for management of the UAV fleet 101A-E at high altitude. Each operator operates a respective computing device 108. While actions of the operators are described herein, each action involves the operator interacting with, sending commands via, and/or receiving commands via the respective computing device 108. More than one operator 106A-C is possible for management of the UAV fleet 101A-E at high altitude. Furthermore, a single, separate operator, such as second operator 106B, may control the descent of a single UAV when the UAV is below a specified altitude and no longer part of the fleet at high altitude. Still further, another operator, such as a third operator 106C, may control the launch and ascent of yet another aircraft until the aircraft joins the fleet at high altitude, at which point the first operator 106A may regain control of the UAV as part of the fleet at high altitude. In another embodiment, there are more than three operators 106A-C at the ground control station 104. In yet another embodiment, the operators 106A-C may be located remotely from the ground control station 104 and/or landing site 102. The operators 106A-C control various aspects of the fleet management. For example, the operators may decide when a UAV needs to descend from high altitude to return to the landing site for maintenance or permanent grounding. In another example, a UAV may determine that the UAV needs to descend, e.g., the UAV senses an onboard malfunction, and communicates to the ground control station 104 that the UAV will be coming in to land. In yet another example, it is also possible that the return of a UAV is on a pre-determined schedule, such as every 100 days. An operator 106A-C may override the schedule and trigger the UAV to return to ground for maintenance or repair if the operator is aware that the UAV is experiencing technical difficulties or has been damaged during flight. In another embodiment, the operator 106A-C may communicate to a UAV of the UAV fleet 101A-E to delay its return until there is another operator available to control the descent of the UAV of the UAV fleet 101A-E. In another embodiment, the operator 106A-C may communicate to a UAV of the UAV fleet 101A-E to delay its return until there are more favorable weather conditions. Still further, the operators 106A-C may reposition the entire UAV fleet 101A-E to avoid extreme weather conditions, such as high winds or turbulence.

The group of operators 106A-C may be in communication with each other to share information on the status of the UAVs they are tracking, in order to facilitate better organization of the fleet.

While the operators 106A-C are depicted as people, each operator 106A-C may be a processor having addressable memory, such as a processor 138 described below and shown in FIG. 2. The management of the UAV fleet 101A-E may be via the operators 106A-C in some embodiments. In other embodiments, control of the UAV fleet 101A-E may be via the ground control 104, an autonomous system, a semi-autonomous system, or the like.

In one embodiment, the number of UAVs in the fleet may be far greater than the number of operators operating the UAVs. More specifically, there may be a certain ratio for the number of UAVs to the number of operators. This is the so-called "N:M" ratio, where N is the number of operators on the ground and M is the number of UAVs in the fleet, such that N<M.

Figure 2:
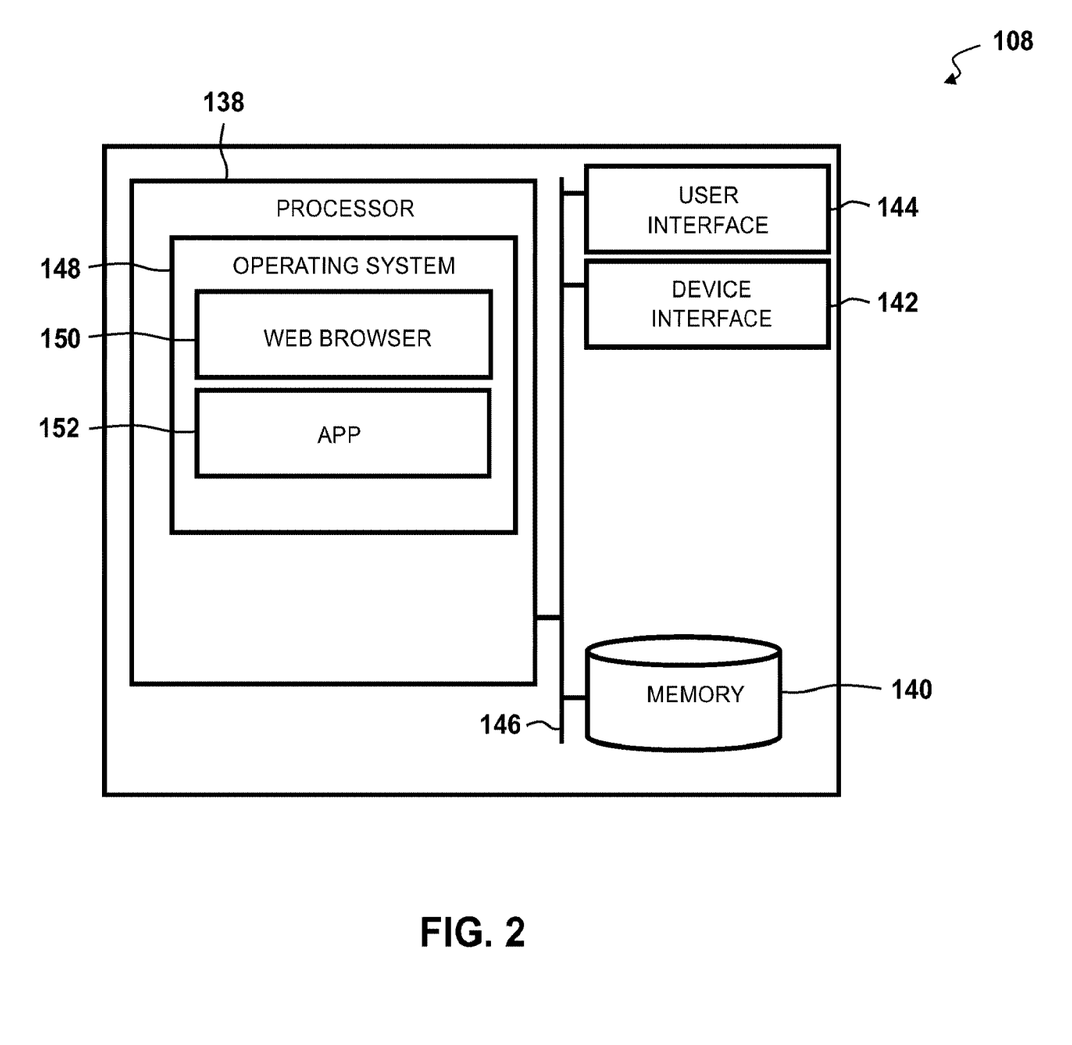
FIG. 2 illustrates a top-level functional block diagram of a computing device associated with an operator at a ground station, according to one embodiment.

FIG. 2 illustrates an example of a top-level functional block diagram of a computing device 108 operated by the operators 106A-C, as shown in FIG. 1. The computing device 108 comprises a processor 138, such as a central processing unit (CPU), addressable memory 140, an external device interface 142, e.g., an optional universal serial bus port and related processing, and/or an Ethernet port and related processing, and an optional user interface 144, e.g., an array of status lights and one or more toggle switches, and/or a display, and/or a keyboard and/or a pointer-mouse system and/or a touch screen. Optionally, the addressable memory may, for example, be: flash memory, eprom, and/or a disk drive or other hard drive. These elements may be in communication with one another via a data bus 146. In some embodiments, via an operating system 148 such as one supporting a web browser 150 and applications 152, the processor 138 may be configured to execute steps of a process establishing a communication channel. For example, the processor 138 may be in communication with the RF receiver 132 to process the received position data of the UAV 101A-E, as shown in FIG. 1.

In another embodiment, a plurality of computing devices 108 associated with the operators 106A-C may be configured to communicate information with one another to form a network and provide redundancy, as will be described in detail below.

Figure 3:
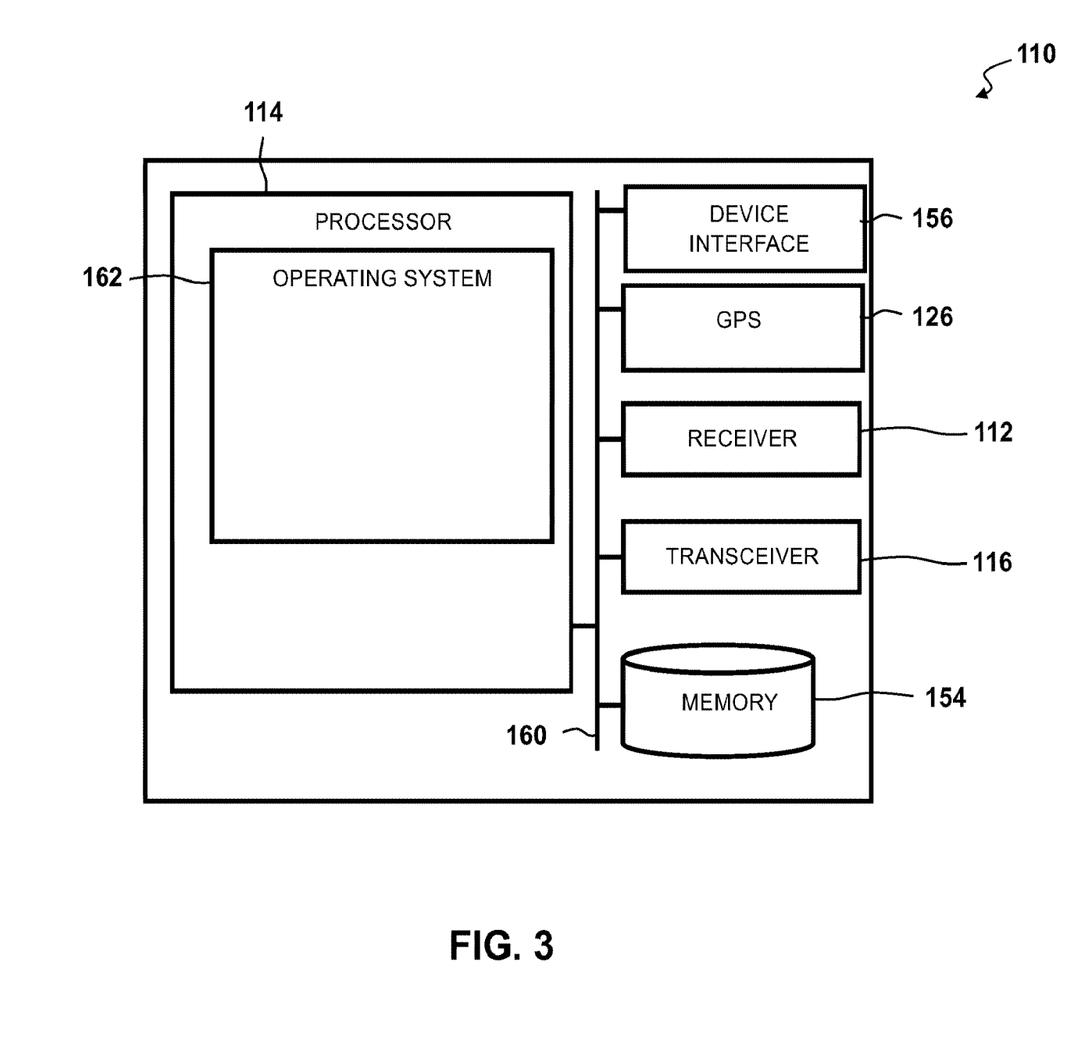
FIG. 3 illustrates a top-level functional block diagram of a computing device of an unmanned aerial vehicle of FIG. 1, according to one embodiment.

Since a UAV does not have an onboard pilot, a flight control computer (FCC) 110 onboard the UAV is the central intelligence of the aircraft. The FCC 110 may partially or completely control much of the functionality of the UAV, such as determining a flight pattern, changing direction of the UAV, and the like.

FIG. 3 illustrates an example of a top-level functional block diagram of the FCC 110 of a UAV aircraft. The FCC 110 comprises at least a processor 114, such as a central processing unit (CPU), addressable memory 154, an external device interface 156, e.g., an optional universal serial bus port and related processing, and/or an Ethernet port and related processing, and an optional user interface, e.g., an array of status lights, sensors and one or more toggle switches. Optionally, the addressable memory may, for example, be: flash memory, eprom, and/or a disk drive or other hard drive. These elements may be in communication with one another via a data bus 160. In one embodiment, the FCC 110 may have a suite of sensors for measuring the current flight status and health status of the aircraft.

In some embodiments, via an operating system 162 such as one supporting applications 164, the processor 114 may be configured to execute steps of a process establishing a communication channel. For example, the processor 114 may be in communication with a receiver 112 configured to receive a command signal from the computing device 108. In one embodiment, the command signal is a descend command signal received by the receiver 112, and the processor executes steps to descend the aircraft. In another embodiment, the command signal is an ascend command signal received by the receiver 112, and the processor 114 executes steps to ascend the aircraft.

The FCC 110 may be further connected to or in communication with a global positioning system (GPS) 126 configured for receiving position data from a constellation of satellites. Still further, the FCC 110 may include a transmitter 116 for transmitting to the ground repeated GPS signals and/or transmitting to the ground translated GPS signals in an auxiliary frequency band to a terrestrial RF receiver 132.

In yet another embodiment, the UAV fleet 101A-E FCCs 110 may each be in communication with one another, where the group flies in station-keeping patterns in the stratospheric level and are collectively within the beam width of a terrestrial emitter, such as the RF emitter 124. Configured as such, the UAVs 101A-E may be semi-autonomous, thereby reducing the requirement of operator workload and the number of operators. One embodiment may include a method for semi-autonomous management of the UAV fleet, where the UAVs 101A-E may communicate with one another for ideal separation, positioning of the fleet for flying in optimal wind conditions, station-keeping the UAV fleet 101A-E, and the like.

In yet another embodiment, the operators 106A-C at the ground control station 104 may be in communication with the UAVs 101A-E via satellite. More specifically, command signals may be sent from the ground to a satellite or constellation of satellites that may relay that signal to the UAVs 101A-E. This will provide for beyond line of sight communication with the UAVs 101A-E if the UAVs 101A-E have been positioned too far away from the ground station 104, e.g., based on wind or environmental reasons.

In some embodiments, as what may be referred to as a handoff between operators, a first operator 106A of the group of operators 106A-C may transmit a descend signal to a first UAV 101A of the fleet of UAVs 101A-E to cause the first UAV 101A to descend, where upon descent of the first UAV 101A below a threshold altitude 118 the first operator 106A may trigger a second operator 106B of the group of operators 106A-C to operate the descent of the first UAV 101A.

With respect to FIG. 1, UAVs 101A,C,D,E are flying above a threshold altitude 118 of approximately 65,000 feet above sea level. An additional UAV 101B is located on the ground, such as at the landing station 102, for maintenance, repair, or the like. A first operator 106A at the ground station 104 is monitoring and in communication with the airborne fleet of UAVs 101A,C,D,E. In another embodiment, more than one operator is monitoring the UAVs 101A,C,D,E. Furthermore, there may be more than four airborne UAVs at a time. For example, hundreds, even thousands of UAVs may comprise the UAV fleet. More specifically, there is a ratio of the number of operators to the number of aircraft in a fleet, the so-called "N:M" ratio, where N is the number of operators and M is the number of UAVs. In this example, N=1 and M=4, yielding a 1:4 ratio. Other N:M ratios are possible and contemplated.

The FCC 110 may transmit to the ground translated GPS signals in an auxiliary frequency band to the terrestrial RF receiver 132 in cooperation with the computing device 108. Furthermore, a terrestrial GPS receiver 134 may communicate the position of the ground station 104 and the landing area 102 to the computing device 108. In turn, the processor 114 may process the received position data of the UAV 101A-E from the RF receiver 132 and the position data of the ground station 104 and the landing area 102 from the GPS receiver 134.

In one embodiment, the UAVs 101A,C,D,E may remain airborne for extended periods of time, such us up to 150 days or possibly longer. The UAVs 101A-E may be required to return to the ground for scheduled maintenance and/or repair. Therefore, the first operator 106A operates the computing device 108 of the ground control station 104 to broadcast a descend command signal 136 to a first UAV 101A. In one embodiment, the descend signal 136 is communicated to the RF emitter 124, and the RF emitter 124 transmits the signal to be received at the first UAV 101A. The signal may be a wireless radio frequency signal. Furthermore, the receiver 112 of the FCC 110 may be tuned to the same frequency as the RF emitter 124. In one example, the descend command signal 136 has a unique identifier code for the particular UAV the descend command signal 136 is in communication with to make sure the signal is not sent to other UAVs in the fleet or to other neighboring UAVs in general. Upon receiving the descend command signal 136 at the FCC 110 of the first UAV 101A, the FCC 110 causes the first UAV 101A to descend, and the other UAVs 101C, D,E remain at high altitude. In another embodiment, the first operator 106A sends additional descend signal if it is desired for additional UAVs to descend.

Figure 4:
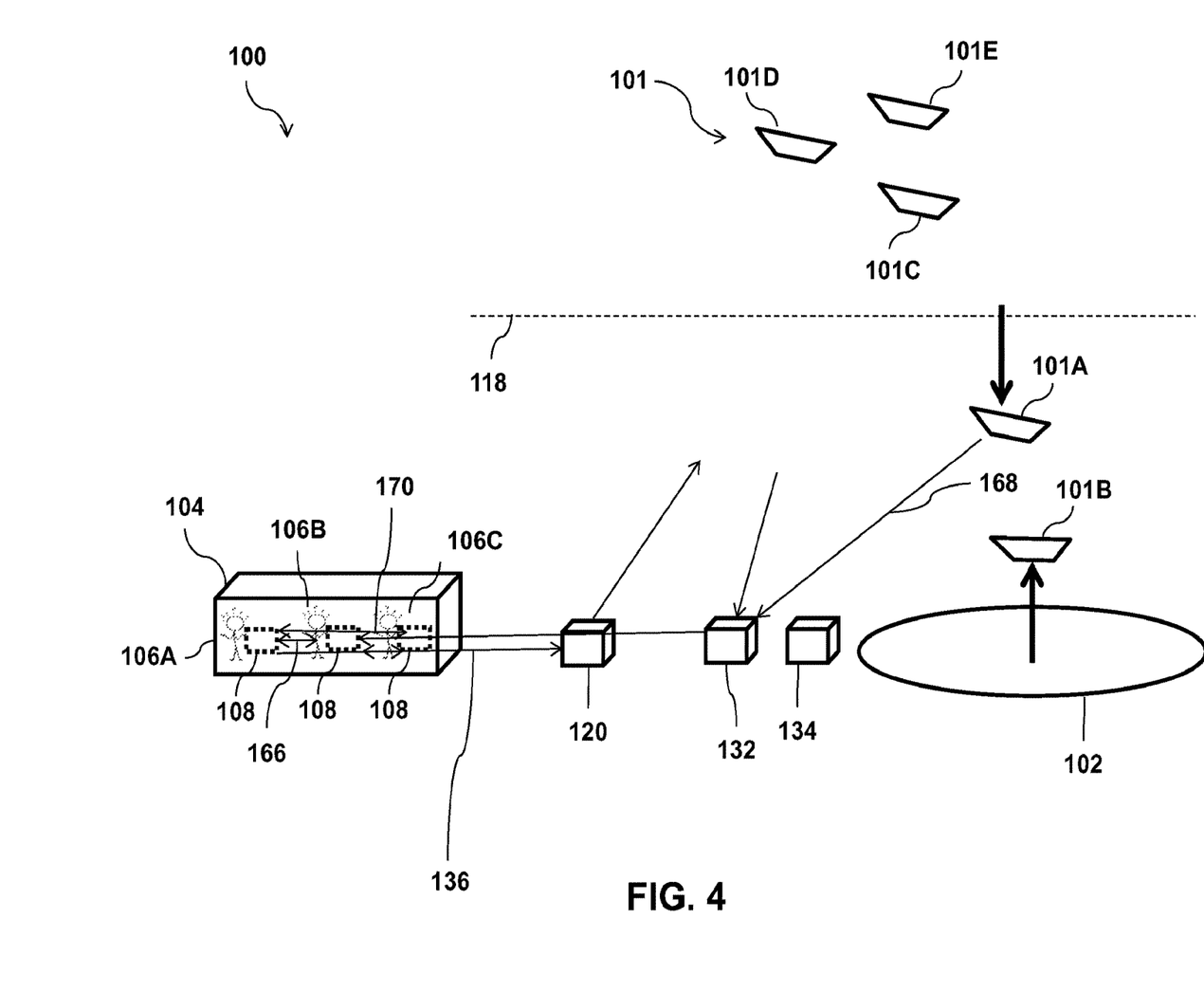
FIG. 4 depicts a process for an unmanned aerial vehicle to descend from high altitude to be replaced by an unmanned aerial vehicle ascending from the ground, according to one embodiment.

More specifically, and with respect to FIG. 4, the first operator 101A sends the descend command signal 136 to the RF emitter 124. The RF emitter 124 then sends the descend command signal 136 to the first UAV 101A, and the first UAV 101A descends below the threshold altitude 118. In another embodiment, the first operator 101A sends the descend command signal 136 to the IR emitter 120. The IR emitter 124 then sends the descend command signal 136 to the first UAV 101A, and the first UAV 101A descends below the threshold altitude 118. In another embodiment, the first operator 101A sends the descend command signal 136 to the visual band emitter 122. The visual band emitter 122 then sends the descend command signal 136 to the first UAV 101A, and the first UAV 101A descends below the threshold altitude 118. Certain regulations, such as FAA certifications, require a certain N:M ratio of 1:1, which may be a function of altitude. More specifically, below the threshold altitude 118 of 65,000 ft, a ratio of one operator per UAV may be required, for a 1:1 ratio. In one embodiment, there is a 1:4 ratio, with operator 106A managing the UAVs 101A,C,D,E. Other ratios, especially where N<M, are possible and contemplated. In one embodiment, threshold altitudes above or below 65,000 ft are possible and contemplated.

Since the first operator 106A monitors the position of the first UAV 101A, the first operator 106A triggers a second operator 106B with a command signal 166 to take over control of the descent when the first UAV 101A has passed below the threshold altitude 118. In another example, the first operator 106A sends the descend command signal to the first UAV 101A, and as soon as the first UAV 101A descends below the threshold altitude 118, the first UAV 101A broadcasts a signal 168 of its position with the transmitter 116 to the RF receiver 132, and the second operator 106B receives the position data from the RF receiver 132. The second operator 106B, in turn, takes over control of the first UAV 101A from the first operator 106A. At this point, the first operator 106A solely controls the fleet UAVs 101C,D,E that are above the threshold altitude 118, providing a 1:3 ratio. Furthermore, second operator 106B is in control of the first UAV 101A, for a 1:1 ratio in compliance with any potential FAA regulations.

In one embodiment, a third operator 106C of the group of operators 106A-C may be triggered by the first operator 106A or the second operator 106B to transmit an ascend signal to a second UAV 101B to control the ascent of the second UAV 101B of the UAV fleet 101A-E from the landing area 102, where upon ascent of the second UAV 101B above the threshold altitude 118, the third operator 106C triggers the first operator 106A of the group of operators 106A-C to operate the second UAV 101B.

Additionally, and in some instances simultaneously, the first operator 106A communicates an ascend signal 170 as the first UAV 101A crosses the threshold altitude 118. The ascend signal 170 is sent to a third operator 106C to alert the operator 106C to launch the second UAV 101B. In another example, the signal is sent to the third operator 106C by the second operator 106B. The second UAV 101B is launched to replace the first UAV 101A that has descended from the airborne fleet. In another embodiment, when the first UAV 101A descends below the threshold altitude 118, the first UAV 101A broadcasts the UAV's 101A position to the RF receiver 132, and the third operator 106C receives the position data from the RF receiver 132. The third operator 106C, in turn, is alerted that the UAV 101A is below the threshold altitude 118 and launches the replacement second UAV 101B.

At this point, the third operator 106C is controlling the ascent of UAV 101B for a 1:1 ratio; the second operator 106B is controlling the descent of UAV 101A also for a 1:1 ratio; and the first operator 106A is controlling the fleet UAVs 106C,D,E above the threshold altitude 118 for a 1:3 ratio. In another embodiment, the first operator 106A or second operator 106B sends additional ascend signals if it is desired for more UAVs to ascend. Alternatively, and if regulations permit, delaying the transition from 1:3 to 1:1 to lower altitude, e.g., a few thousand feet instead of 65,000 ft, would require fewer operators, resulting in simpler logistics and reduced costs.

In another embodiment, the first operator 106A or second operator 106B sends the ascend signal 170 to the replacement second UAV 101B before the first UAV 101A has descended below the threshold altitude. More specifically, the second UAV 101B may ascend and join the fleet before or just as the first UAV 101A begins its descent. Therefore, the fleet may always be comprised of at least four UAVs.

In another embodiment, multiple UAVs may be ascending and multiple UAVs may be descending at the same time, with each ascending or descending UAV controlled by one operator. In yet another embodiment, more UAVs may be ascending than the number of UAVs descending, since it may be desired to have at least four, i.e., a complete fleet with no gap in coverage, over station at all times.

Figure 5:
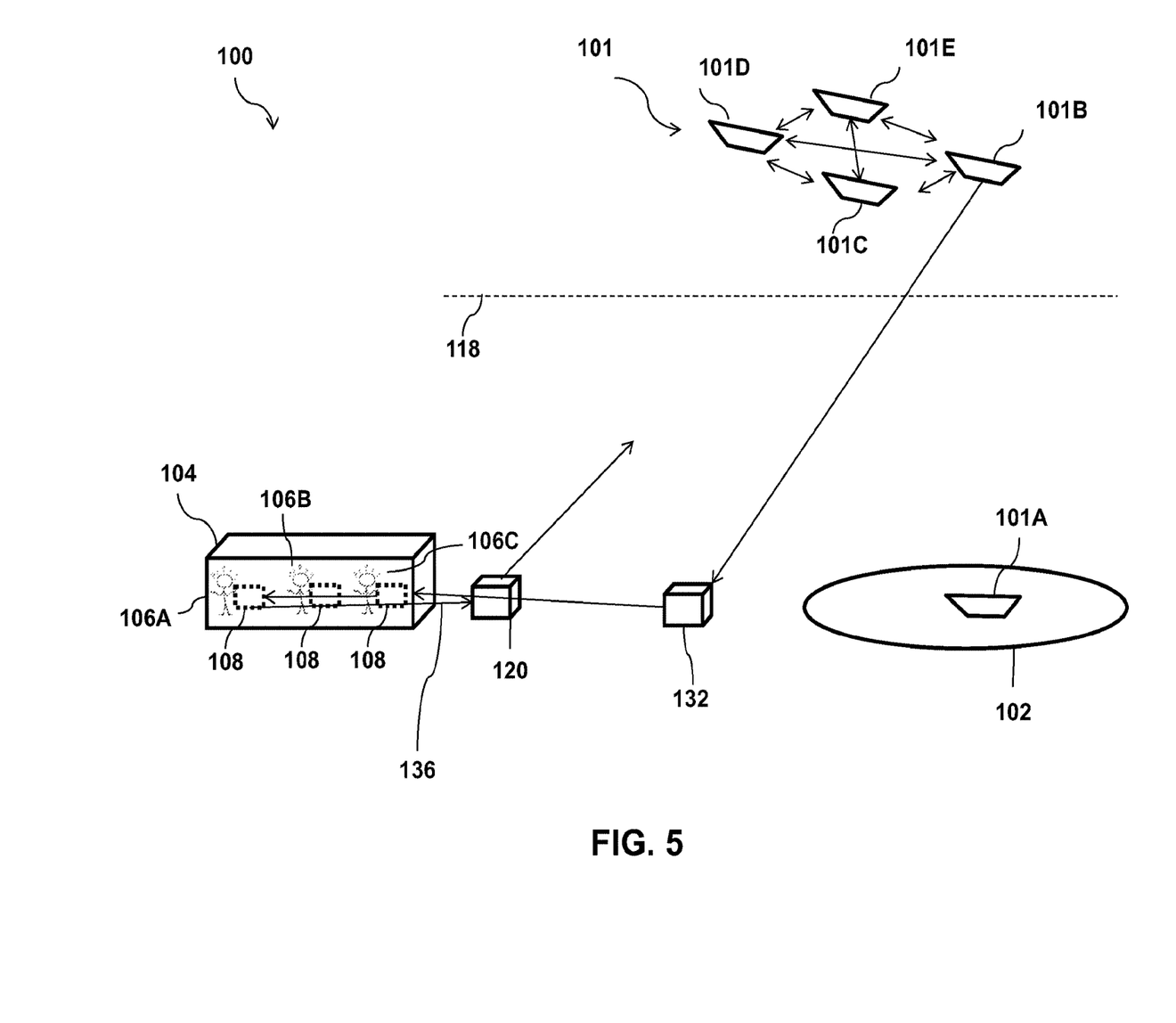
FIG. 5 depicts a process for the ascending unmanned aerial vehicle of FIG. 4 to join the fleet at high altitude and the descending unmanned aerial vehicle of FIG. 4 to land at a landing site, according to one embodiment.

With reference to FIG. 5, the first UAV 101A has landed at the landing site 102. The second UAV 101B has joined the airborne fleet of UAVs 10B-E, where upon ascending across the threshold altitude 118, the third operator 106C sends a command signal to the first operator 106A to take over control of the second UAV 101B. In another embodiment, when the second UAV 101B ascends above the threshold altitude 118, the second UAV 101B broadcasts its position to the RF receiver 132, and the first operator 106C receives the position data from the RF receiver 132. The first operator 106A, in turn, is alerted that the second UAV 101B is above the threshold altitude 118 and takes over operation of the replacement second UAV 101B.

At this point, second operator 106B and third operator 106C are no longer operating a UAV, and first operator 106A is controlling the fleet UAVs 101B,C,D,E above the threshold altitude 118 for a 1:4 ratio.

According to the aspects of the different embodiments, the transition from N:M (where N<M) to 1:1 operator-to-UAV ratio below a threshold altitude may permit a fleet of UAVs to comply with FAA laws as well as provide for decreased operator workload and fleet management operation costs.

Figure 6:
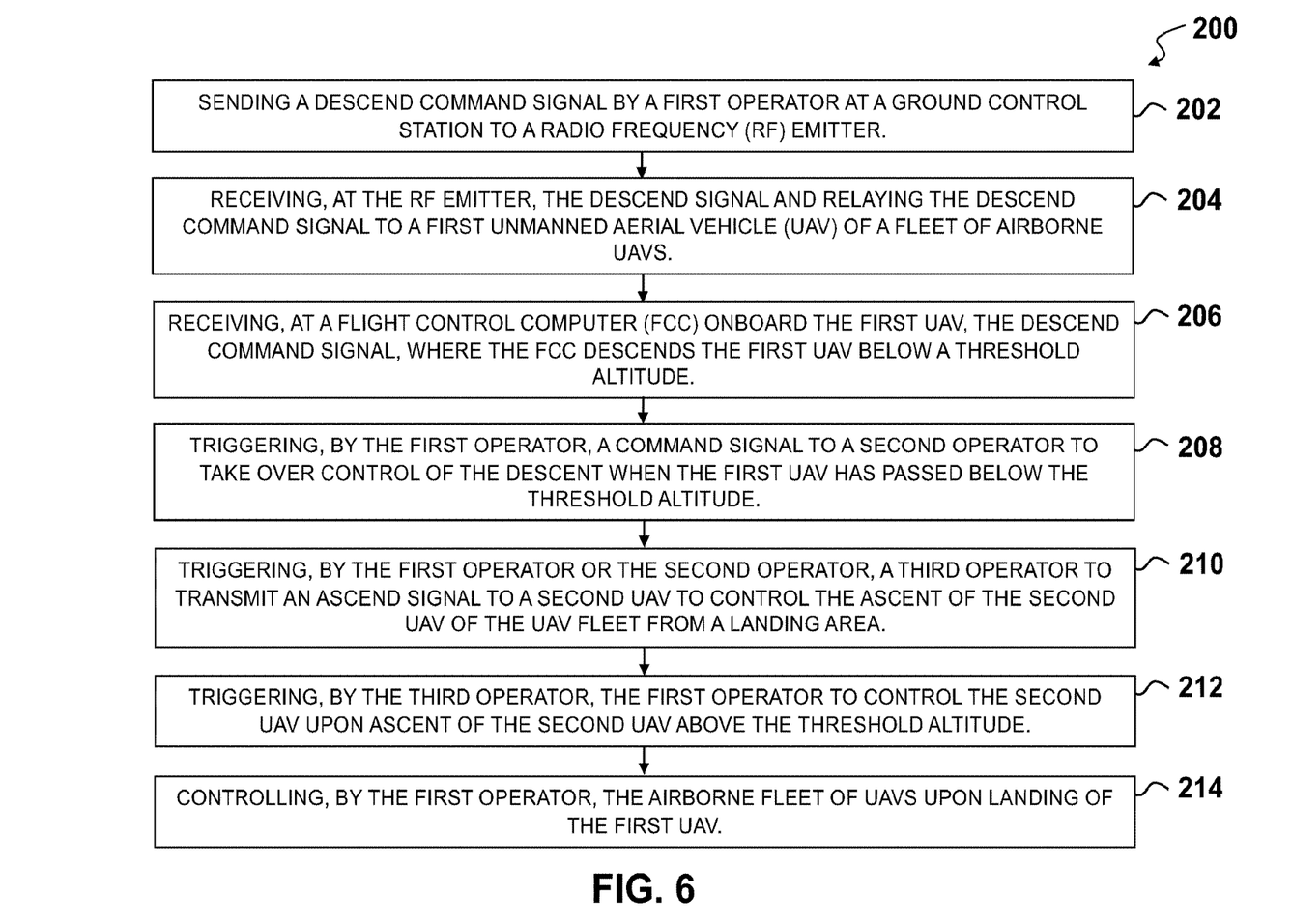
FIG. 6 depicts a flow diagram of a method for managing a fleet of unmanned aerial vehicles, according to one embodiment.

With respect to FIG. 6, a flowchart for a method 200 of method for managing a fleet of unmanned aerial vehicles (UAVs) is illustrated. The UAVs need to be managed in an optimal way to mitigate strong wind and turbulence exposure. Furthermore, the UAVs may need to be brought down to land by an operator (or operators) at the ground station for servicing and maintenance, and then re-launched to join the airborne fleet. At a step 202, a first operator at a ground station sends a descend command signal to a radio frequency (RF) emitter. At step 204, the RF emitter receives the descend command signal and, in turn, relays the descend command signal to a first UAV of a fleet of airborne UAVs. At step 206, a flight control computer (FCC) onboard the first UAV receives the descend command signal and the FCC descends the first UAV below a threshold altitude. In another embodiment, the operator sends the descend command signal to an infrared (IR) emitter. The IR emitter then sends the descend command signal to the first UAV, and the first UAV descends below the threshold altitude. In another embodiment, the operator sends the descend command signal to a visual band emitter. The visual band emitter then sends the descend command signal to the first UAV, and the first UAV descends below the threshold altitude.

In one embodiment, the first operator monitors the position of the first UAV. At a step 208, the first operator triggers a second operator with a command signal to take over control of the descent when the first UAV has passed below the threshold altitude. In another embodiment, the operator sends the descend command signal to the first UAV, and as soon as the first UAV descends below the threshold altitude, the first UAV broadcasts a signal of its position with a transmitter to an RF receiver on the ground, and the second operator receives the position data from the RF receiver. The operator, in turn, takes over control of the first UAV from the first operator. At this point, the first operator solely controls the airborne fleet UAVs that are above the threshold altitude.

At step 210, a third operator may be triggered by the first operator or the second operator to transmit an ascend signal to a second UAV to control the ascent of the second UAV of the UAV fleet from a landing area. Upon ascent of the second UAV above the threshold altitude, the third operator triggers the first operator to control the second UAV, at a step 212. At step 214, the first operator then controls the airborne fleet of UAVs upon landing of the first UAV.

Additionally, and in some instances simultaneously, the first operator communicates an ascend signal as the first UAV crosses the threshold altitude. The ascend signal is sent to the third operator to alert the operator to launch the second UAV. In another embodiment, the ascend signal is sent to the third operator by the second operator. The second UAV is launched to replace the first UAV that has descended from the airborne fleet. In another embodiment, when the first UAV descends below the threshold altitude, the first UAV broadcasts the first UAV's position to the RF receiver, and the third operator receives the position data from the RF receiver. The third operator, in turn, is alerted that the first UAV is below the threshold altitude and launches the replacement second UAV.

At this point, the third operator is controlling the ascent of the second UAV, the second operator is controlling the descent of the first UAV, and the first operator is controlling the remaining fleet of UAVs above the threshold altitude. In another embodiment, the first operator or second operator sends additional ascend signals if it is desired for more UAVs to ascend.

In another embodiment, the first operator or second operator sends the ascend signal to the second replacement UAV before the first UAV has descended below the threshold altitude. More specifically, the second UAV may ascend and join the fleet before or just as the first UAV begins its descent.

In another embodiment, multiple UAVs may be ascending and multiple UAVs may be descending at the same time, with each ascending or descending UAV controlled by one operator. In yet another embodiment, more UAVs may be ascending than the number of UAVs descending, since it may be desired to have at least four (i.e., a complete fleet with no gap in coverage) over station at all times.

In one embodiment, when the first UAV has landed at the landing site and the second UAV have joined the airborne fleet ascending across the threshold altitude, the third operator sends a command signal to the first operator to take over control of the second UAV. In another embodiment, when the second UAV ascends above the threshold altitude, the second UAV broadcasts its position to the RF receiver, and the first operator receives the position data from the RF receiver. The first operator, in turn, is alerted that the second UAV is above the threshold altitude and takes over operation of the replacement second UAV. At this point, the second operator and third operator are no longer operating a UAV, and the first operator is controlling the fleet of UAVs.

Figure 7:
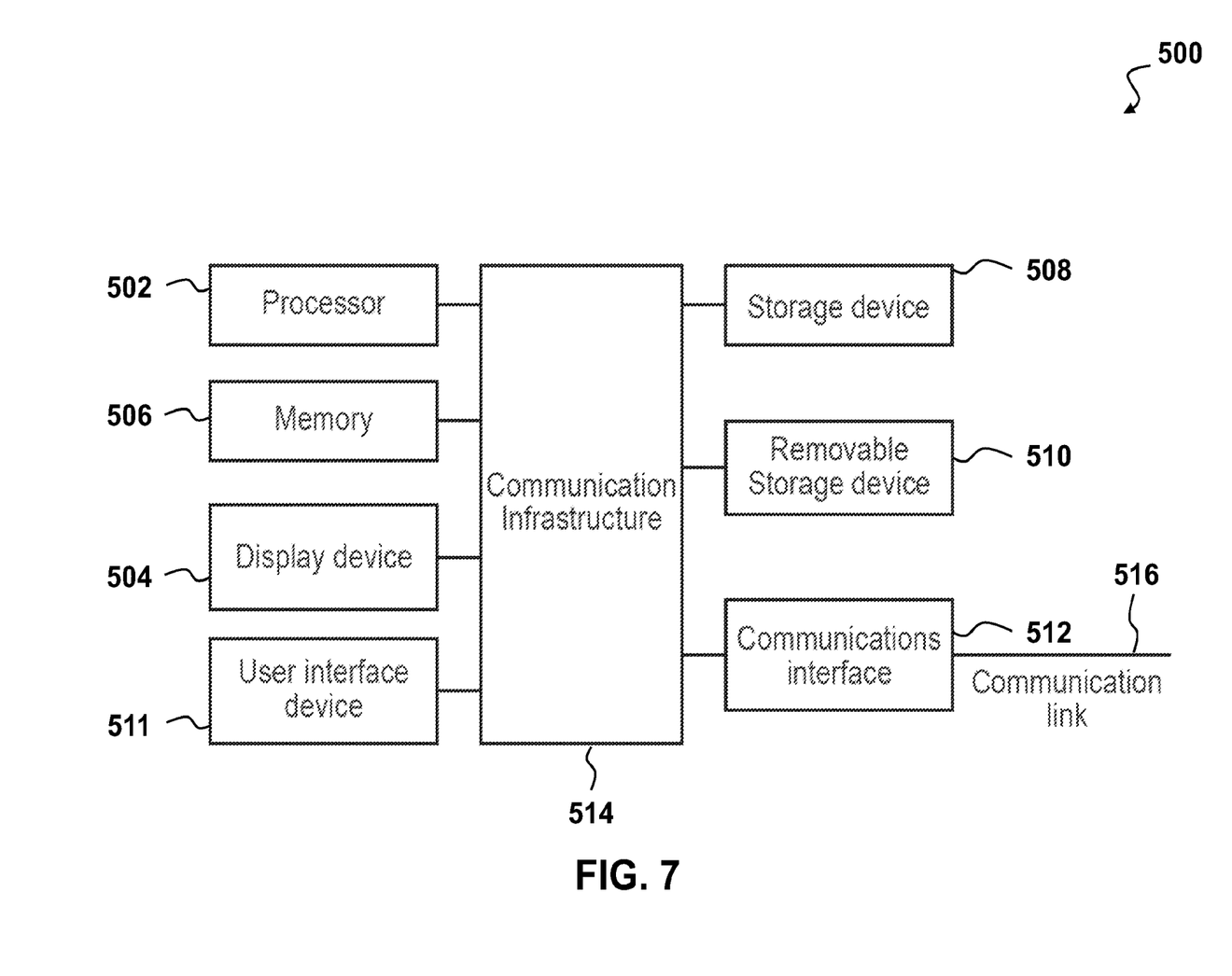
FIG. 7 shows a high-level block diagram and process of a computing system for implementing an embodiment of the system and process.

FIG. 7 is a high-level block diagram 500 showing a computing system comprising a computer system useful for implementing an embodiment of the system and process, disclosed herein. Embodiments of the system may be implemented in different computing environments. The computer system includes one or more processors 502, and can further include an electronic display device 504 (e.g., for displaying graphics, text, and other data), a main memory 506 (e.g., random access memory (RAM)), storage device 508, a removable storage device 510 (e.g., removable storage drive, a removable memory module, a magnetic tape drive, an optical disk drive, a computer readable medium having stored therein computer software and/or data), user interface device 511 (e.g., keyboard, touch screen, keypad, pointing device), and a communication interface 512 (e.g., modem, a network interface (such as an Ethernet card), a communications port, or a PCMCIA slot and card). The communication interface 512 allows software and data to be transferred between the computer system and external devices. The system further includes a communications infrastructure 514 (e.g., a communications bus, cross-over bar, or network) to which the aforementioned devices/modules are connected as shown.

Information transferred via communications interface 514 may be in the form of signals such as electronic, electromagnetic, optical, or other signals capable of being received by communications interface 514, via a communication link 516 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 512. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 8:
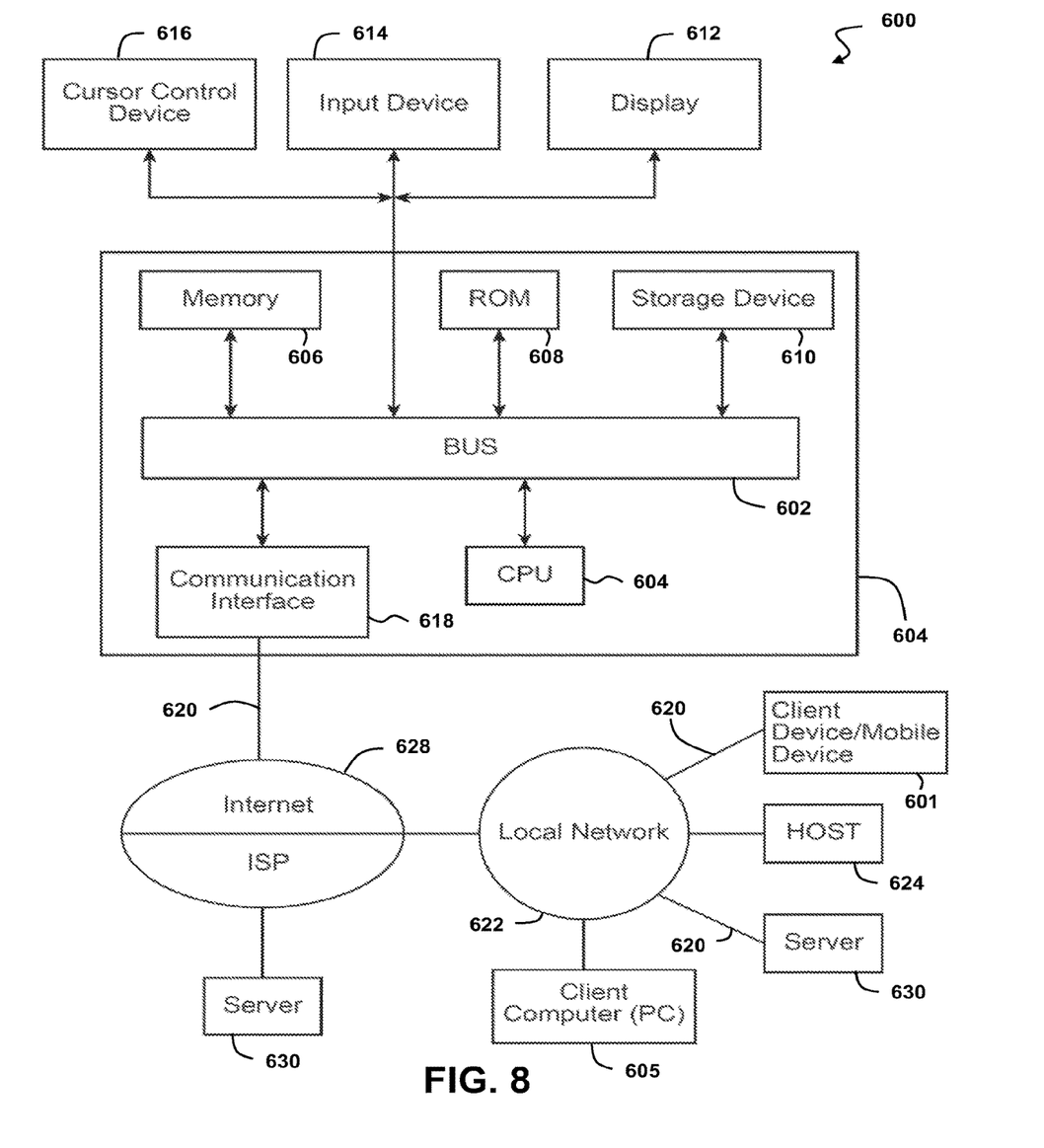
FIG. 8 shows a block diagram and process of an exemplary system in which an embodiment may be implemented.

FIG. 8 shows a block diagram of an example system 600 in which an embodiment may be implemented. The system 600 includes one or more client devices 601 such as consumer electronics devices, connected to one or more server computing systems 630. A server 630 includes a bus 602 or other communication mechanism for communicating information, and a processor (CPU) 604 coupled with the bus 602 for processing information. The server 630 also includes a main memory 606, such as a random access memory (RAM) or other dynamic storage device, coupled to the bus 602 for storing information and instructions to be executed by the processor 604. The main memory 606 also may be used for storing temporary variables or other intermediate information during execution or instructions to be executed by the processor 604. The server computer system 630 further includes a read only memory (ROM) 608 or other static storage device coupled to the bus 602 for storing static information and instructions for the processor 604. A storage device 610, such as a magnetic disk or optical disk, is provided and coupled to the bus 602 for storing information and instructions. The bus 602 may contain, for example, thirty-two address lines for addressing video memory or main memory 606. The bus 602 can also include, for example, a 32-bit data bus for transferring data between and among the components, such as the CPU 604, the main memory 606, video memory and the storage 610. Alternatively, multiplex data/address lines may be used instead of separate data and address lines.

The server 630 may be coupled via the bus 602 to a display 612 for displaying information to a computer user. An input device 614, including alphanumeric and other keys, is coupled to the bus 602 for communicating information and command selections to the processor 604. Another type or user input device comprises cursor control 616, such as a mouse, a trackball, or cursor direction keys for communicating direction information and command selections to the processor 604 and for controlling cursor movement on the display 612.

According to one embodiment, the functions are performed by the processor 604 executing one or more sequences of one or more instructions contained in the main memory 606. Such instructions may be read into the main memory 606 from another computer-readable medium, such as the storage device 610. Execution of the sequences of instructions contained in the main memory 606 causes the processor 604 to perform the process steps described herein. One or more processors in a multi-processing arrangement may also be employed to execute the sequences of instructions contained in the main memory 606. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 604 for execution. Such a medium may take many forms, including but not limited to, non-volatile media, volatile media, and transmission media. Non-volatile media includes, for example, optical or magnetic disks, such as the storage device 610. Volatile media includes dynamic memory, such as the main memory 606. Transmission media includes coaxial cables, copper wire and fiber optics, including the wires that comprise the bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 604 for execution. For example, the instructions may initially be carried on a magnetic disk of a remote computer. The remote computer can load the instructions into its dynamic memory and send the instructions over a telephone line using a modem. A modem local to the server 630 can receive the data on the telephone line and use an infrared transmitter to convert the data to an infrared signal. An infrared detector coupled to the bus 602 can receive the data carried in the infrared signal and place the data on the bus 602. The bus 602 carries the data to the main memory 606, from which the processor 604 retrieves and executes the instructions. The instructions received from the main memory 606 may optionally be stored on the storage device 610 either before or after execution by the processor 604.

The server 630 also includes a communication interface 618 coupled to the bus 602. The communication interface 618 provides a two-way data communication coupling to a network link 620 that is connected to the world wide packet data communication network now commonly referred to as the Internet 628. The Internet 628 uses electrical, electromagnetic or optical signals that carry digital data streams. The signals through the various networks and the signals on the network link 620 and through the communication interface 618, which carry the digital data to and from the server 630, are exemplary forms or carrier waves transporting the information.

In another embodiment of the server 630, interface 618 is connected to a network 622 via a communication link 620. For example, the communication interface 618 may be an integrated services digital network (ISDN) card or a modem to provide a data communication connection to a corresponding type of telephone line, which can comprise part of the network link 620. As another example, the communication interface 618 may be a local area network (LAN) card to provide a data communication connection to a compatible LAN. Wireless links may also be implemented. In any such implementation, the communication interface 618 sends and receives electrical electromagnetic or optical signals that carry digital data streams representing various types of information.

The network link 620 typically provides data communication through one or more networks to other data devices. For example, the network link 620 may provide a connection through the local network 622 to a host computer 624 or to data equipment operated by an Internet Service Provider (ISP). The ISP in turn provides data communication services through the Internet 628. The local network 622 and the Internet 628 both use electrical, electromagnetic or optical signals that carry digital data streams. The signals through the various networks and the signals on the network link 620 and through the communication interface 618, which carry the digital data to and from the server 630, are exemplary forms or carrier waves transporting the information.

The server 630 can send/receive messages and data, including e-mail, program code, through the network, the network link 620 and the communication interface 618. Further, the communication interface 618 can comprise a USB/Tuner and the network link 620 may be an antenna or cable for connecting the server 630 to a cable provider, satellite provider or other terrestrial transmission system for receiving messages, data and program code from another source.

The example versions of the embodiments described herein may be implemented as logical operations in a distributed processing system such as the system 600 including the servers 630. The logical operations of the embodiments may be implemented as a sequence of steps executing in the server 630, and as interconnected machine modules within the system 600. The implementation is a matter of choice and can depend on performance of the system 600 implementing the embodiments. As such, the logical operations constituting said example versions of the embodiments are referred to for e.g., as operations, steps or modules.

Similar to a server 630 described above, a client device 601 can include a processor, memory, storage device, display, input device and communication interface (e.g., e-mail interface) for connecting the client device to the Internet 628, the ISP, or LAN 622, for communication with the servers 630.

The system 600 can further include computers (e.g., personal computers, computing nodes) 605 operating in the same manner as client devices 601, where a user can utilize one or more computers 605 to manage data in the server 630.

Figure 9:
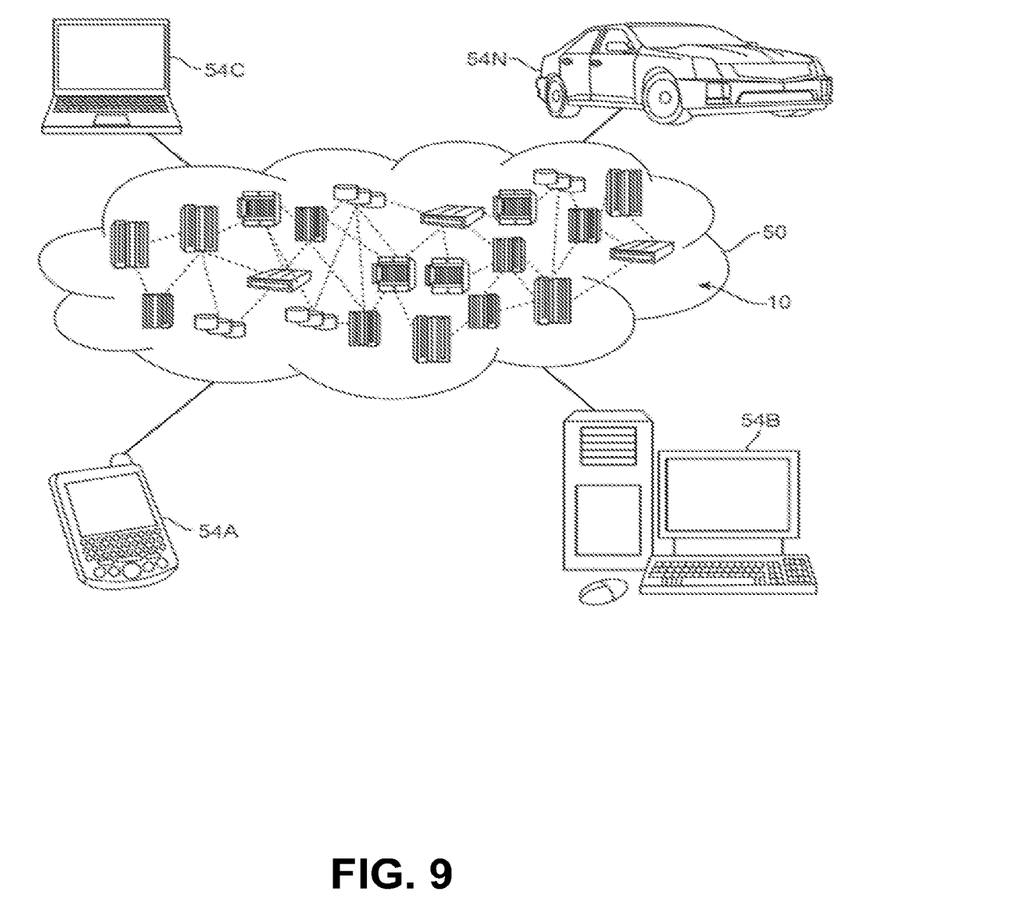
FIG. 9 depicts a cloud computing environment for implementing an embodiment of the system and process disclosed herein.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

What is claimed is:

1. A system, comprising:
    a fleet of three or more unmanned aerial vehicles (UAVs), wherein each UAV of the fleet of UAVs comprise a respective flight control computer (FCC);
    at least one computing device at a ground control station, wherein each computing device is in communication with each FCC of the fleet of three or more UAVs, and wherein each computing device is associated with at least one operator of a set of operators;
    wherein upon a descent of a first UAV below a threshold altitude, a first computing device triggers a second computing device to operate the descent of the first UAV;
    wherein the fleet of UAVs above the threshold altitude are in communication with the first computing device monitored by at least one operator such that a ratio of UAVs to operators above the threshold altitude exceeds a 1:1 ratio;
    wherein the first UAV below the threshold altitude is in communication with the second computing device monitored by at least one operator such that a ratio of UAVs to operators below the threshold altitude does not exceed the 1:1 ratio; and
    wherein the descent of the first UAV below the threshold altitude is delayed until there is an operator available to control the descent of the first UAV.

2. The system of claim 1, wherein the first computing device transmits a descend signal to the first UAV of the fleet of three or more UAVs to cause the first UAV to descend.

3. The system of claim 1, wherein the first computing device transmits an ascend signal to a second UAV of the fleet of three or more UAVs to cause the second UAV to ascend.

4. The system of claim 3, wherein upon a launch of the second UAV from a landing area, the first computing device triggers a third computing device to operate the launch and ascent of the second UAV.

5. The system of claim 4, wherein upon the ascent of the second UAV above the threshold altitude, the third computing device triggers the first computing device to operate the second UAV as part of the fleet of three or more UAVs.

6. The system of claim 1, wherein the threshold altitude is 65,000 feet.

7. The system of claim 1, wherein each UAV in the fleet of three or more UAVs is a High Altitude Long Endurance Aircraft.

8. A method, comprising:
    sending, by a first computing device of at least one computing device at a ground control station, a descend command signal for a first unmanned aerial vehicle (UAV) of a fleet of three or more UAVs;
    triggering, by the first computing device, a second computing device to operate a descent of the first UAV upon the descent of the first UAV below a threshold altitude;
    wherein the fleet of UAVs above the threshold altitude are in communication with the first computing device monitored by at least one operator such that a ratio of UAVs to operators above the threshold altitude exceeds a 1:1 ratio;
    wherein the first UAV below the threshold altitude is in communication with the second computing device monitored by at least one operator such that a ratio of UAVs to operators below the threshold altitude does not exceed the 1:1 ratio; and
    delaying the descent of the first UAV below the threshold altitude until there is an operator available to control the descent of the first UAV.

9. The method of claim 8, wherein each UAV of the fleet of UAVs comprises a respective flight control computer (FCC), wherein the first computing device and the second computing device are in communication with each FCC of the fleet of three or more UAVs, and wherein the first computing device and the second computing device are associated with at least one operator of a set of operators.

10. The method of claim 9 further comprising:
receiving, by the respective FCC of the first UAV, the sent descend command signal; and
descending, by the first UAV controlled by the respective FCC, in response to the sent descend command signal.

11. The method of claim 9, further comprising:
sending, by the first computing device, an ascend command signal for a second unmanned aerial vehicle (UAV) located on a landing area.

12. The method of claim 11, further comprising:
triggering, by the first computing device, a third computing device to operate a launch and ascent of the second UAV up to the threshold altitude.

13. The method of claim 12, further comprising:
triggering, by the third computing device, the first computing device to operate the second UAV upon the ascent of the second UAV above the threshold altitude as part of the fleet of three or more UAVs.

14. The method of claim 8, wherein the threshold altitude is 65,000 feet.

15. The method of claim 8, wherein each UAV in the fleet of three or more UAVs is a High Altitude Long Endurance Aircraft.

16. The method of claim 8, further comprising:
delaying the descent of the first UAV below the threshold altitude until there are more favorable weather conditions.

17. The system of claim 1, wherein the descent of the first UAV below the threshold altitude is delayed until there are more favorable weather conditions.

* * * * *